United States Patent
Cole et al.

(10) Patent No.: US 11,312,253 B2
(45) Date of Patent: Apr. 26, 2022

(54) VEHICLE CHARGING CONNECTION USING RADIO FREQUENCY COMMUNICATION

(71) Applicant: ABB Schweiz AG, Baden (CH)

(72) Inventors: Gregory A. Cole, West Hartford, CT (US); Sree Shankar, Bloomfield, CT (US)

(73) Assignee: ABB SCHWEIZ AG, Baden (CH)

( * ) Notice: Subject to any disclaimer, the term of this patent is extended or adjusted under 35 U.S.C. 154(b) by 156 days.

(21) Appl. No.: 16/579,213

(22) Filed: Sep. 23, 2019

(65) Prior Publication Data

US 2021/0086631 A1 Mar. 25, 2021

(51) Int. Cl.
| | |
|---|---|
| *H02J 7/00* | (2006.01) |
| *B60L 53/16* | (2019.01) |
| *H04B 17/27* | (2015.01) |
| *G06K 7/10* | (2006.01) |
| *B60L 53/35* | (2019.01) |
| *B60L 53/30* | (2019.01) |
| *H01Q 1/22* | (2006.01) |

(52) U.S. Cl.
CPC ............ *B60L 53/16* (2019.02); *B60L 53/305* (2019.02); *B60L 53/35* (2019.02); *G06K 7/10336* (2013.01); *H01Q 1/2208* (2013.01); *H04B 17/27* (2015.01); *B60Y 2200/91* (2013.01); *B60Y 2300/91* (2013.01)

(58) Field of Classification Search
CPC ........ B60L 53/16; B60L 53/35; B60L 53/305; H01Q 1/2208; H04B 17/27; G06K 7/10336; B60Y 2300/91; B60Y 2200/91

USPC .............................................. 320/109; 701/22
See application file for complete search history.

(56) References Cited

U.S. PATENT DOCUMENTS

| | | | |
|---|---|---|---|
| 7,009,561 B2 | 3/2006 | Menache et al. | |
| 8,169,186 B1 | 5/2012 | Haddad et al. | |
| 9,477,893 B2 | 10/2016 | Findeisen et al. | |
| 9,925,887 B2 | 3/2018 | McGrath et al. | |
| 10,418,863 B1 * | 9/2019 | Jadidian .................. | H02J 50/90 |
| 2008/0030422 A1 | 2/2008 | Gevargiz et al. | |
| 2013/0193918 A1 | 8/2013 | Sarkar et al. | |
| 2014/0333261 A1 * | 11/2014 | Oh .......................... | B60L 53/16 320/109 |
| 2018/0152031 A1 | 5/2018 | Zhai et al. | |

FOREIGN PATENT DOCUMENTS

| | | | | |
|---|---|---|---|---|
| EP | 1742078 A1 * | 1/2007 | ........... | H01Q 1/3241 |
| EP | 1742078 A1 | 1/2007 | | |

OTHER PUBLICATIONS

Search Report and Written Opinion, PCT Serial No. PCT/US2020051021, 9 pgs., dated Dec. 8, 2020.

* cited by examiner

*Primary Examiner* — Zixuan Zhou
(74) *Attorney, Agent, or Firm* — Greenberg Traurig, LLP

(57) ABSTRACT

A charging connection is provided for charging a battery of a vehicle using an external power source. The first connector is coupled to the external power source with an electric cable. The second connector is coupled to the vehicle. The first connector is automatically guided for connection to the second connector using radio frequency signals to couple the first and second connectors so that electrical energy is supplied to the vehicle from the first connector to the second connector.

16 Claims, 3 Drawing Sheets

VEHICLE CHARGING CONNECTION USING RADIO FREQUENCY COMMUNICATION

BACKGROUND

It is expected that the use of electric vehicles will increase substantially in the years ahead. One particular area of interest is electrically powered passenger vehicles, although heavy vehicles like freight trucks and busses are also of interest. In order for electric vehicles to be more commonly used, it will be necessary to develop electric charging stations and electrical connectors for coupling a charging station to an electric vehicle.

Such systems have unique concerns due to the power requirements and electrical connections that will be needed to charge the electric vehicle. For example, the electric charging cables and connectors will need to be properly connected to the vehicle inlet in order for proper charging to occur Some systems require the vehicle operator (if the vehicle has a human operator) to handle the hardware to make the connection. The handling of electric power must occur in a safe and reliable manner to prevent harm to the operator and to ensure proper connections with the vehicle are obtained.

Automatic connection devices can be employed to reduce operator error and improve safety. However, localizing the electrical connector of the charging station with respect to the vehicle inlet presents other challenges. For example, the location of the vehicle inlet may be on the side of the vehicle or under the vehicle, which is an environment subject to much contamination. Therefore, cameras, sensors, and other guiding devices must be cleaned for robust operation and/or are subject to contamination which affects accuracy.

SUMMARY

A charging connection is described for coupling an external power source, such as at an electric charging station, to a vehicle, such as an electric vehicle. The charging connection has a first connector associated with the external power source and a second connector associated with the vehicle. The first connector has one or more antennas, such as radio frequency (RF) antennas, that communicate with one or more RF tags, such as radio frequency identification (RFID) tags or other wireless RF tag such as Bluetooth, WiFi, or near field communication (NFC), associated with the second connector. The RF communications are used to guide the connection of the first and second connectors together to provide electrical energy to the vehicle from the external power source.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The invention may be more fully understood by reading the following description in conjunction with the drawings, in which.

DETAILED DESCRIPTION

For the purposes of clearly, concisely and exactly describing illustrative embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

Figure 1:
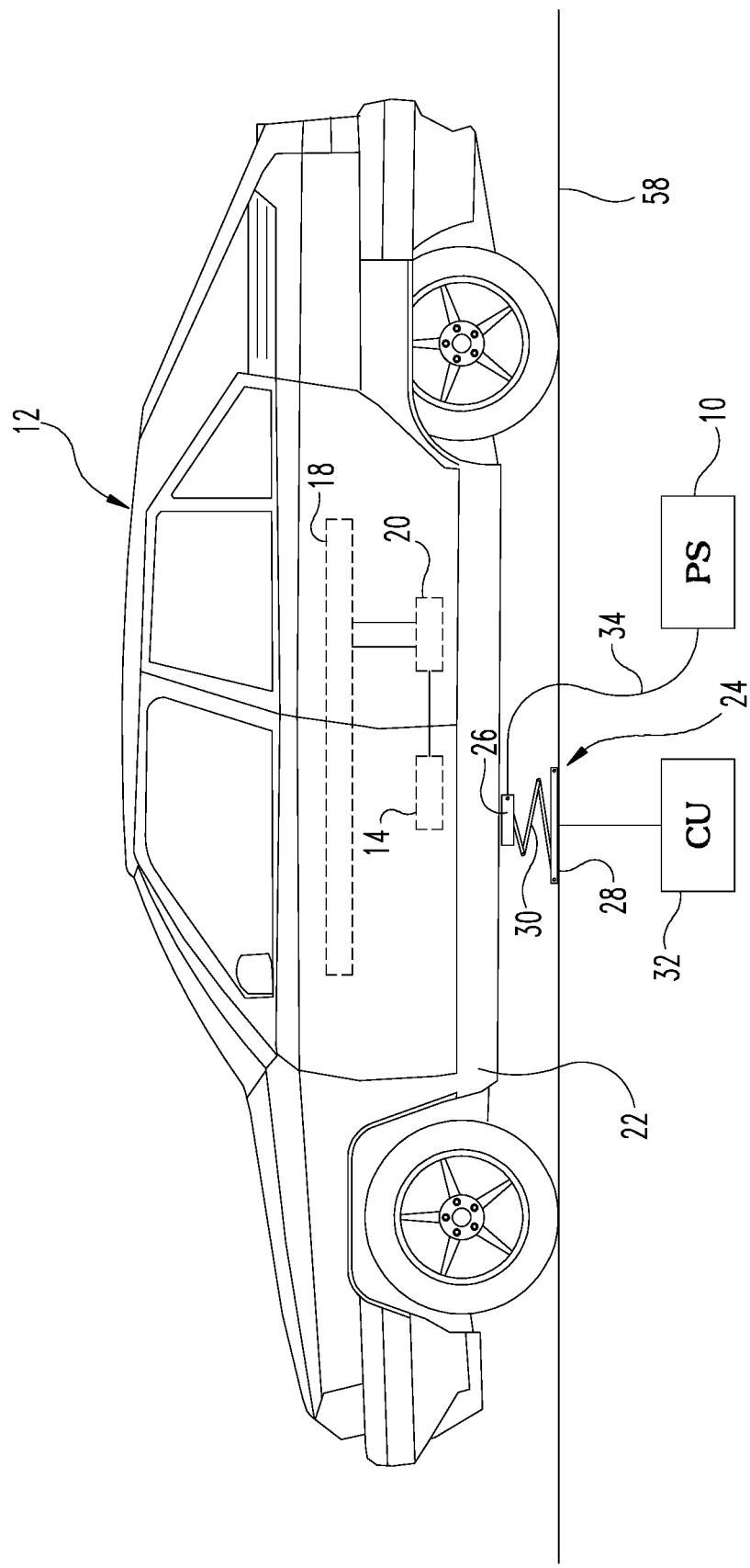
FIG. 1 is a schematic view of an electrical charging station and an electric vehicle.

One embodiment of an automatic connection system is shown in FIG. 1. As is known, the electric vehicle 12 has a battery 18 that powers the vehicle 12 and requires periodic recharging. Typically, an onboard electric charger 20 is included on the vehicle 12 for charging the battery 18. The vehicle 12 also includes a vehicle charge inlet 14 for receiving an electric charge from an external power source 10. Although the vehicle charge inlet 14 may also be located on a side of the vehicle 12, in the illustrated embodiment the charge inlet 14 is underneath the vehicle body 22.

The automatic connection system further includes a charging station connection device 24 for connecting a first connector such as a charge head 26 to a second connector such as the vehicle charge inlet 14. Although the connection between the charging station charge head 26 and the vehicle charge inlet 14 may be a non-contact connection (e.g., inductive), it is contemplated that the connection between the charge head 26 and the charge inlet 14 involved physical contact between first and second connectors. For example, the charge inlet 14 or charge head 26 could have one or more conductive pins, and the other could have one or more corresponding conductive sockets that engage with the pins. Thus, when physically contacting each other, electrical energy from an external power supply 10 flows through the charge head 26 and charge inlet 14 to supply a charge to the onboard charger 20 and battery 18 to recharge the vehicle 12 as a result of the connection between the first and second connectors 26, 14.

The charge head 26 can be connected to a base 28 that rests on or is attached to the floor 58, ground, or other non-movable structure. A powered linkage 30 is provided between the base 28 and the charge head 26 to allow the charge head 26 to move relative to the base 28 in order to connect the charge head 26 and the charge inlet 14 together. Movement of the linkage 30 and the charge head 26 is automatically and/or remotely controlled by a control unit 32.

Figure 2:
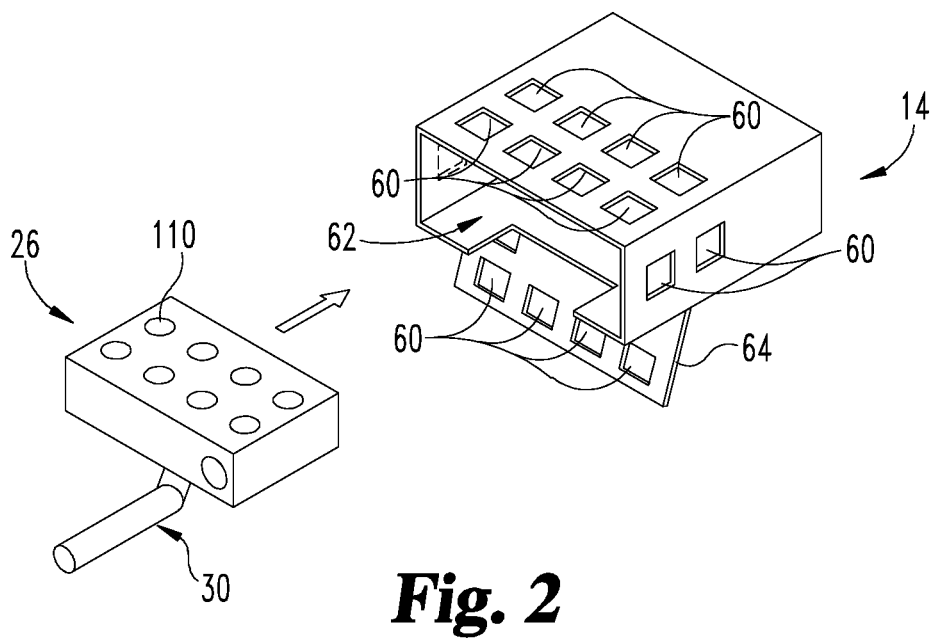
FIG. 2 is a perspective schematic view showing a charge inlet of the vehicle and a charge head of an automatic connection system.

In one embodiment, shown in FIG. 2, the charge inlet 14 includes a plurality of RF tags 60. RF tags 60 can be provided around an inlet port 62 of charge inlet 14 that receives the charge head 26 to establish the connection. RF tags 60 can be located on the interior of the charge inlet 14 and/or on a door 64 that opens and closes the inlet port 62. RF tags 60 emit an RF signal that is detected by one or more RF antenna 110 of charge head 26 to guide movement of the charge head 26 for connection to charge inlet 14 using the automatic connection system.

Figure 3:
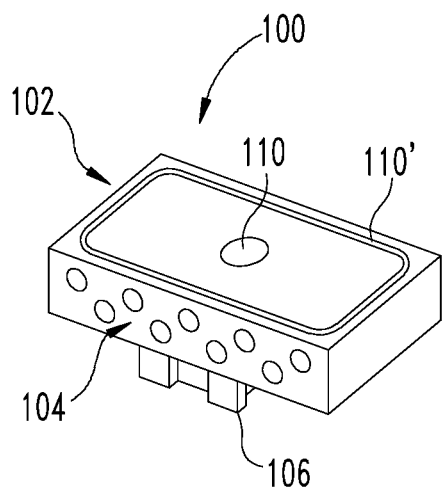
FIG. 3 is a perspective view of one embodiment of a charge head for the automatic connection system.

Referring to FIG. 3, one embodiment of charge head 26 is shown and designated as charge head 100. Charge head 100 includes a body 102 having a plurality of connecting sockets 104 for electrically connecting to a plurality of pins of the charge inlet 14. Other embodiments contemplate that body 102 includes one or more pins for such a connection. Body 102 also includes an adapter 106 for connection to a charging cable 34 or the like from external power source 10.

Body 102 further includes a first RF antenna 110 and a second RF antenna 110' on a surface 112 of body 102 that interfaces with charge inlet 14. The RF antennas 110, 110' may be cast into a plastic of body 102, bonded to body 102 by an adhesive, and/or covered to a plastic sheath, for example. The RF antenna 110 and RF antenna 110' receive signals from RF tags 60 for localization of the charge head 100 relative to the charge inlet 14. First RF antenna 110 can be smaller than second RF antenna 110' to provide faster localization of the charge head 100 relative to the inlet port 62 of the charge inlet 14.

For example, second RF antenna 110', extending around a perimeter of body 102 and around first RF antenna 110, can be employed for a first, rough localization of the charge head 100 relative to the inlet port 62 based on a relative signal strength from the RF tags 60. The smaller, more accurate first RF antenna 110 located centrally on body 102 relative to second RF antenna 110' can be employed for final localization and guiding of the charge head 100 into inlet port 62 in order to make the electrical connection.

In another embodiment, a single RF antenna 110 is employed that transmits at a first transmission power to provide a first, rough localization of the charge head 100 relative to the inlet port 62. The RF antenna 110 then employs a second, lesser transmission power to provide the final localization and guiding of the charge head 100 into the inlet port 62 in order to make the electrical connection.

Figure 4:
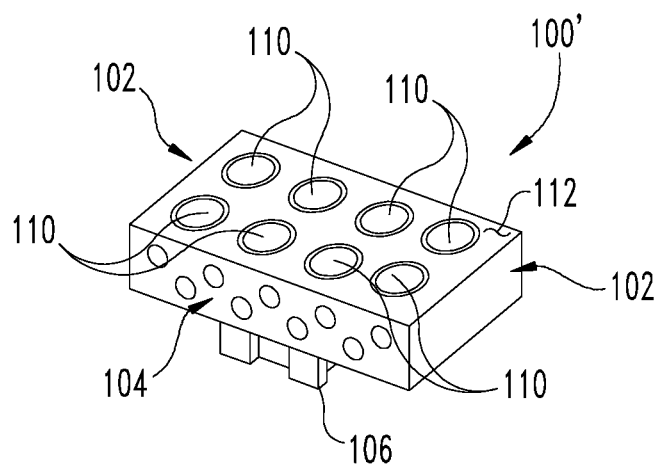
FIG. 4 is a perspective view of another embodiment charge head for the automatic connection system.

Referring to FIG. 4, another embodiment of charge head 26 is shown and designated as charge head 100'. Charge head 100' is similar to charge head 100, but includes a plurality of RF antennas 110 arranged in an array or a grid on a surface 112 of body 102. In one embodiment, each RF antenna 110 can be embodied as a flexible circuit on an outer surface 112 of body 102.

In the illustrated embodiment, RF antennas 110, 110' are shown on one surface 112 of body 102. Other embodiments contemplated RF antenna 110, 110' on other surfaces. In other embodiments, one larger RF antenna 110' can be employed with multiple smaller RF antennas 110.

Figure 5:
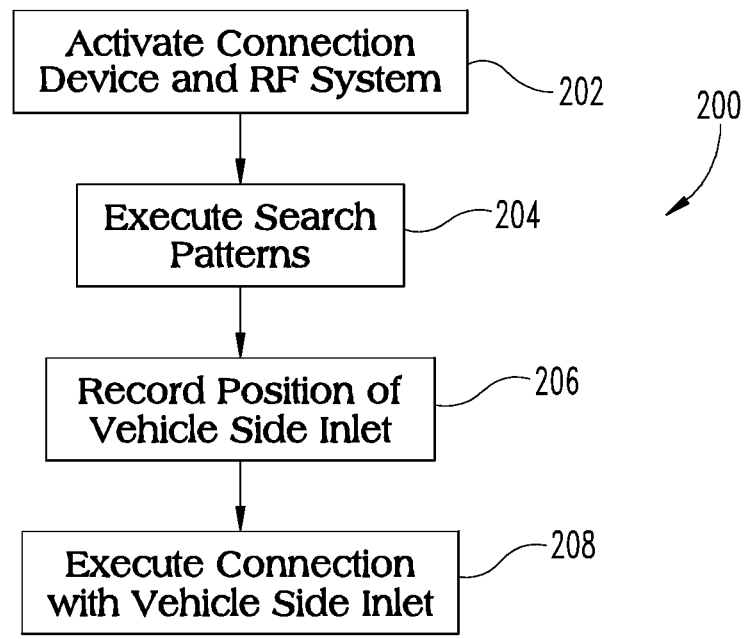
FIG. 5 is a flow diagram of a procedure for connecting the charge head of the automatic connection system with the vehicle charge inlet.

Turning to FIG. 5, a procedure 200 for automatically connecting an electric power source 10 to an electric vehicle 12 is shown. In the first operation 202 of procedure 200, the connection device 24 and the RF tags 60 are initiated so that the RF antenna 110 and/or 110' can detect RF signals emitted by the RF tags 60. The second operation 204 includes executing a search pattern so the RF antenna 110 and/or 110' receive the RF signals emitted from the RF tags 60. The search pattern can be binary such that the RF signal is detected or it is not detected, or the search pattern can be based on a received signal strength indication (RSSI).

For a binary search pattern, each antenna, such as antenna 110, 110' of charge head 100, is shielded such as with aluminum or other suitable material, to reduce or narrow the region of detection to block the RF signal in certain directions and prevent premature detection of RF signals from RF tags 60. The antenna 110, 110' may swipe across the surface of the charge inlet 14 to detect the RF signal. Once an RF signal is detected, the coordinates of the detected RF tag(s) 60 relative to the charge head antenna 110, 110' is recorded to guide the charge head 100 closer to the charge inlet 14.

For an RSSI search pattern, the RF tags 60 and antenna 110 are unshielded so that the relative signal strength can be used as a preliminary metric for guiding the charge head 100' to the inlet port 62 of the charge inlet 14. Each antenna 110 of charge head 100' records the RSSI for a specific RF tag 60 within its read range. By measuring the gradient of RSSI received by each antenna 110, a direction of increasing RSSI can be established for each RF tag 60 to obtain a direction of exploration for movement of the charge head 100'. A search pattern can be executed using search vectors based on a gradient of the RSSI. The location of the inlet port 620 of the charge inlet 14 can be determined and recorded as the location of charge head 110' where all the RF antenna 110 obtain a maximum RSSI, or an RSSI above a tuned threshold value.

Procedure 200 continues at operation 206 where the position of the charge inlet 14 and/or inlet port 62 is identified relative to the charge head 26. As discussed above, this can be a binary determination or based on RSSI. Once the position of the charge inlet is determined, a template for engaging the charge head 26 to the charge inlet 14 can be executed at operation 208 based on the collected data to make the final connection. For example, the layout of the RF tags 60 based on the initial mounting pattern on the charge inlet 14 can be used to determine the two dimensional transformation matrix for connecting the charge head 26 to the vehicle inlet 14.

As the location of the charge inlet 14 is being determined, the connecting device 24 may move the charge head 26, 100, 100' toward the charge inlet 14 with the linkage 30. It is understood that the location determination of the charge inlet 14 described above based on the binary detection and/or RSSI of RF tags 60 and the relative location of the charge inlet 14 may not be precise enough to allow a final connection between the charge head 26, 100, 100' and the charge inlet 14. That is, while such positioning may move the charge head 26, 100, 100' to the needed connection location, further movement may also be necessary to achieve successful connection of the charge head 26, 100, 100' and the charge inlet 14. In this case, it may be desirable for the final connection of the charge inlet 14 to be directly sensed by the charge head 26 after moving the charge head 26 into the charge inlet 14 and actually connecting with the charge inlet 14. This may be done with the same or different sensors. The charge head 26, 100, 100' may then be used to permit electric charge from the external power source 10 to charge the battery 18 of the vehicle 12.

Figure 6:
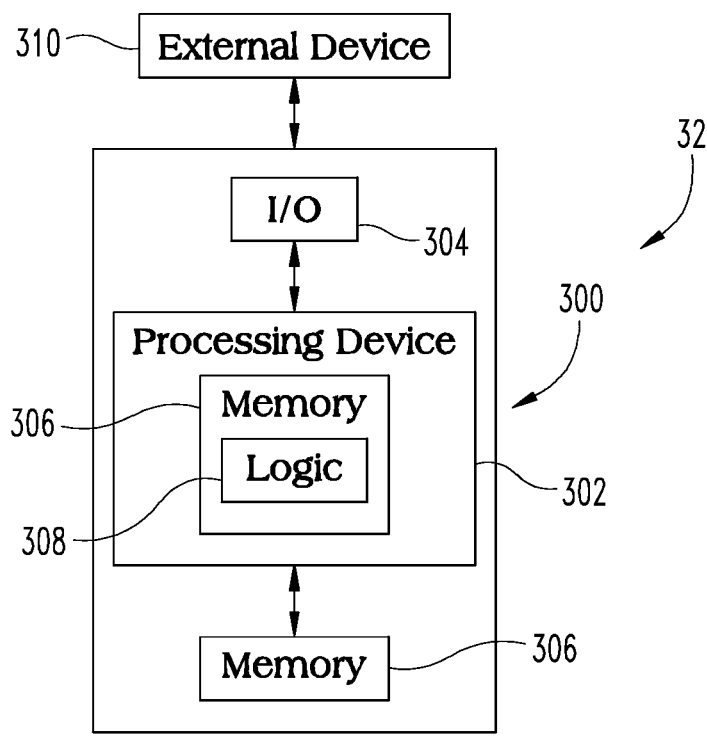
FIG. 6 is a schematic block diagram of an exemplary controller apparatus.

In FIG. 6 there is a schematic block diagram of an exemplary controller apparatus 200 such as may be provided as control unit 32 in FIG. 1. Controller 200 may include a processor 202, an input/output device 204, memory 206, and operating logic 208. Furthermore, the controller 200 communicates with one or more other controllers 200 of an external device 310 such as power source 10 and/or vehicle 12, and/or communicate with one or more sensors such as RF antenna 110, 110' and/or RF tags 60. Controller 200 may be a stand-alone device, an embedded system, or a plurality of devices structured to perform the functions described with respect to the automatic connection system described herein.

The processor 202 may be embodied as, or otherwise include, any type of processor, controller, or other compute circuit capable of performing various tasks such as computer functions and/or controlling the functions of the automatic connection system. For example, the processor 202 may be embodied as a single or multi-core processor(s), a microcontroller, or other processor or processing/controlling circuit. In some embodiments, the processor 202 may be embodied as, include, or be coupled to an FPGA, an application specific integrated circuit (ASIC), reconfigurable hardware or hardware circuitry, or other specialized hardware to facilitate performance of the functions described herein. Additionally, in some embodiments, the processor 202 may be embodied as, or otherwise include, a high-power processor, an accelerator co-processor, or a storage controller. In some embodiments still, the processor 202 may include more than one processor, controller, or compute circuit.

In the illustrative embodiment, the processor 202 may include memory 206. The memory 206 may be embodied as any type of volatile (e.g., dynamic random access memory (DRAM), etc.) or non-volatile memory capable of storing data (e.g., operating logic 208 defined by programming instructions such as software or firmware or by hardwired logic or other hardware) therein. Volatile memory may be embodied as a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In some embodiments, the memory 206 may be embodied as a block addressable memory, such as those based on NAND or NOR technologies. The memory 206 may also include future generation nonvolatile devices, such as a three dimensional crosspoint memory device, or other byte addressable write-in-place nonvolatile memory devices. In some embodiments, the memory 206 may be embodied as, or may otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint may comprise a transistor-less stackable cross point architecture in which memory cells sit at the intersection of word lines and bit lines and are individually addressable and in which bit storage is based on a change in bulk resistance. Memory 206, in some embodiments, may be internal to (e.g., incorporated into) the processor 202 and/or the memory 206 may be external to the processor 202.

The illustrative input/output device 204 is configured to enable the controller 200 to communicate with other local controllers (e.g., control devices included in the vehicle 12) or a central controller. The input/output device 204 may include a network adapter, network credential, interface, or a port (e.g., a USB port, serial port, parallel port, an analog port, a digital port, VGA, DVI, HDMI, FireWire, CAT 5, Ethernet, fiber, or any other type of port or interface), to name but a few examples. The input/output device 204 may include more than one of these adapters, credentials, or ports, such as a first port for receiving data and a second port for transmitting data, for example.

As described above with reference to FIG. 5, the memory 206 may have instructions stored therein that are executable by the processor 202 to cause the processor 202 to evaluate the signals from RF tags 60 that are received by the antenna 110, 110' in either a binary manner or for a received signal strength indication. Based on that evaluation, the instructions stored in the memory 206 may be executable by the processor 202 to cause the processor 202 to guide movement linkage 30 to connect charge head 26 with vehicle inlet 14.

Controller 200 may be configured to collect, store and/or process operational information regarding the charging connection with the vehicle inlet 14. Operational information may include, for example, an elapsed time for making the connection; an initial location of the vehicle relative to the first connector; an initial configuration of the first connector; a time of day and date at which the connection is made; calibration data associated with at least one of the first connector, the second connector and the external power source; an initial charge of a battery of the vehicle; a duration of the connection; system calibration information; user operating habits; and parking specifications. Other data is also contemplated and not precluded. The collected data can be analyzed to optimize future operating performance of the system and make further improvements or changes in the automatic connection system.

Various aspects of the present disclosure are contemplated. According to one aspect, a charging connection between an external power source and a vehicle is provided. The charging connection includes a first connector coupled to the external power source with an electric cable and a second connector coupled to the vehicle. The first connector includes at least one radio frequency antenna and a first connection arrangement for delivering electrical energy from the electric cable. The second connector includes at least one radio frequency tag and a second connection arrangement connectable to the first connection arrangement to deliver the electrical energy to the vehicle. The at least one radio frequency antenna detects a signal from the at least one radio frequency tag to guide the first connector for connection with the second connector.

In one embodiment, the at least one radio frequency tag includes a plurality of radio frequency tags. In another embodiment, the at least one radio frequency antenna is located on or adjacent an outer surface of the first connector that interfaces with the second connector. In yet another embodiment, the at least one radio frequency antenna includes a first radio frequency antenna or first transmission power for an initial localization of the first connector relative to the second connector and a second radio frequency antenna or second transmission power for a final localization of the first connector relative to the second connector.

In still another embodiment, the at least one radio frequency antenna includes four or more radio frequency antennas arranged in a grid on the first connector. In a refinement of this embodiment, the at least one radio frequency tag includes a plurality of radio frequency tags and the four or more radio frequency antennas simultaneously detect radio signals emitted by the plurality of radio frequency tags.

In another embodiment, detection of the signal from the at least one radio frequency tag by the at least one radio frequency antenna is binary. In yet another embodiment, detection of the signal from the at least one radio frequency tag by the at least one radio frequency antenna includes an indication of a strength of the detected signal.

In another embodiment, a controller is configured to process the signal received by the at least one radio frequency antenna. In one refinement of this embodiment, the controller is configured to guide placement of the first connector relative to the second connector in response to a strength of the signal received by the at least two radio frequency antennas. In another refinement, the controller is configured to execute a random search pattern for a binary detection of the signal by the at least two radio frequency antennas to locate the second connector relative to the first connector.

In yet another refinement, the controller is configured to execute a search pattern using search vectors based on a gradient of a received signal strength by the at least two antennas from the at least one radio frequency tag. In still another refinement, the controller is configured to collect operational data for storage regarding the connection of the first connector with the second connector, the operational data including one or more of: an elapsed time for making the connection; an initial location of the vehicle relative to the first connector; an initial configuration of the first connector; a time of day and date at which the connection is made; calibration data associated with at least one of the first connector, the second connector and the external power source; an initial charge of a battery of the vehicle; and a duration of the connection.

According to another aspect, a method for establishing a charging connection between an electric charging station and a vehicle includes detecting a radio frequency signal emitted by a vehicle connector with at least one antenna of a charging station connector, and guiding the charging station connector for connection with the vehicle connector in response to the radio frequency signal detected by the at least one antenna.

In one embodiment of the method, the charging station connector is guided by a received signal strength of the radio frequency signal from the vehicle connector. In another embodiment, the charging station connector is guided by a binary detection of the radio frequency signal from the vehicle connector. In yet another embodiment, the charging station connector includes a first antenna for guiding the charging station connector to an initial location relative to the vehicle connector and a second antenna for guiding the charging station connector for connection with the vehicle connector.

In still another embodiment, the vehicle connector includes a plurality of radio frequency tags emitting radio frequency signals for detection by the at least one antenna of the charging station connector. In a refinement of this embodiment, the charging station connector includes a plurality of radio frequency antennas arranged in a grid.

In another embodiment, the charging station connector is guided for connection with the vehicle connector with an automatic connection system. In still another embodiment, the vehicle connector is located under the vehicle.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

What is claimed is:

1. A system, comprising:
a first connector coupled to an external power source with an electric cable, the first connector for delivering electrical energy from the electric cable and the first connector includes at least one radio frequency antenna;
a second connector coupled to a vehicle, the second connector connectable to the first connector to deliver the electrical energy to the vehicle and the second connector includes at least one radio frequency tag; and
a controller configured to process a signal received by the at least one radio frequency antenna;
wherein the at least one radio frequency antenna detects a signal from the at least one radio frequency tag using one of a directionally shielded binary search pattern and a received signal strength indication search pattern for the signal to guide the first connector for connection with the second connector;
wherein the controller is configured to guide placement of the first connector for a first localization relative to the second connector in response to a first signal received by a first radio frequency antenna extending around a perimeter of a body of the first connector and then guide placement of the first connector into the second connector in response to a second signal received by a second radio frequency antenna located centrally on the body of the first connector.

2. The system according to claim 1, wherein the at least one radio frequency tag includes a plurality of radio frequency tags.

3. The system according to claim 1, wherein the at least one radio frequency antenna is located on or adjacent an outer surface of the first connector that interfaces with the second connector.

4. The system according to claim 1, wherein the at least one radio frequency antenna includes a first radio frequency antenna or first transmission power for an initial localization of the first connector relative to the second connector and a second radio frequency antenna or second transmission power for a final localization of the first connector relative to the second connector.

5. The system according to claim 1, wherein the at least one radio frequency antenna includes four or more radio frequency antennas arranged in a grid on the first connector.

6. The system according to claim 5, wherein the at least one radio frequency tag includes a plurality of radio frequency tags and the four or more radio frequency antennas simultaneously detect radio signals emitted by the plurality of radio frequency tags.

7. The system according to claim 1, wherein the controller is configured to collect operational data for storage regarding the connection of the first connector with the second connector, the operational data including one or more of: an elapsed time for making the connection; an initial location of the vehicle relative to the first connector; an initial configuration of the first connector; a time of day and date at which the connection is made; calibration data associated with at least one of the first connector, the second connector and the external power source; an initial charge of a battery of the vehicle; and a duration of the connection.

8. A charging connection between an external power source and a vehicle, comprising:
   a first connector coupled to the external power source with an electric cable, the first connector for delivering electrical energy from the electric cable, the first connector including at least one radio frequency antenna;
   a second connector coupled to the vehicle, the second connector connectable to the first connector to deliver the electrical energy to the vehicle, the second connector including at least one radio frequency tag, wherein the at least one radio frequency antenna detects a signal from the at least one radio frequency tag to guide the first connector for connection with the second connector; and
   a controller configured to process the signal received by the at least one radio frequency antenna, wherein the controller is configured to execute a random search pattern for a binary detection of the signal by the at least one radio frequency antenna to locate the second connector relative to the first connector.

9. A charging connection between an external power source and a vehicle, comprising:
   a first connector coupled to the external power source with an electric cable, the first connector for delivering electrical energy from the electric cable, the first connector including at least one radio frequency antenna;
   a second connector coupled to the vehicle, the second connector connectable to the first connector to deliver the electrical energy to the vehicle, the second connector includes at least one radio frequency tag, wherein the at least one radio frequency antenna detects a signal from the at least one radio frequency tag to guide the first connector for connection with the second connector; and
   a controller configured to process the signal received by the at least one radio frequency antenna, wherein the controller is configured to execute a search pattern using search vectors based on a gradient of a received signal strength by the at least one radio frequency antenna from the at least one radio frequency tag.

10. A method for establishing a charging connection between an electric charging station and a vehicle, comprising:
   detecting a radio frequency signal emitted by a vehicle connector with at least one antenna of a charging station connector using one of a directionally shielded binary search pattern and a received signal strength search indication search pattern for the signal; and
   guiding the charging station connector for connection with the vehicle connector in response to the radio frequency signal detected by the at least one antenna;
   wherein the charging station connector includes a first antenna extending around a perimeter of a body of the charging station connector for guiding the charging station connector to an initial location relative to the vehicle connector and a second antenna centrally located on the body of the charging station connector for guiding the charging station connector into the vehicle connector for connection with the vehicle connector.

11. The method according to claim 10, wherein the charging station connector is guided by a controller configured to process the radio frequency signal and execute the received signal strength indication search pattern using search vectors based on a gradient of a received signal strength of the radio frequency signal from the vehicle connector.

12. The method according to claim 10, wherein the charging station connector is guided by a controller configured to process the radio frequency signal and execute a random search pattern for binary detection of the radio frequency signal from the vehicle connector to locate the charging station connector relative to the vehicle connector.

13. The method according to claim 10, wherein the vehicle connector includes a plurality of radio frequency tags emitting radio frequency signals for detection by the at least one antenna of the charging station connector.

14. The method according to claim 13, wherein the charging station connector includes a plurality of radio frequency antennas arranged in a grid.

15. The method according to claim 10, wherein the charging station connector is guided for connection with the vehicle connector with an automatic connection system.

16. The method according to claim 10, wherein the vehicle connector is located under the vehicle.

\* \* \* \* \*